June 15, 1943.  C. G. LINDQUIST  2,322,037

PHOTOGRAPHIC FILM

Filed April 17, 1940

CARL G. LINDQUIST
INVENTOR

BY

ATTORNEY

Patented June 15, 1943

2,322,037

UNITED STATES PATENT OFFICE 2,322,037

PHOTOGRAPHIC FILM

Carl G. Lindquist, Rochester, N. Y., assignor to Eastman Kodak Company, Rochester, N. Y., a corporation of New Jersey Application April 17, 1940, Serial No. 330,132
In Great Britain July 7, 1939

3 Claims. (Cl. 95—9)

This invention relates to an improved photographic film.

As is pointed out in the United States patent to Beach, No. 2,084,313 granted June 27, 1937, the tendency of thin sheets to generate static and stick together is greatly lessened by incorporating in their surfaces an almost imperceptible amount of very finely divided matting material such as chalk. While photographic film is much thicker and does not have the same tendency to stick together, I have found that if very small amounts of matting material is incorporated in a gelatin layer of such film, not only is static greatly reduced or eliminated but also certain other advantages are attained.

Reference will be made to the accompanying drawing wherein

Figure 1:
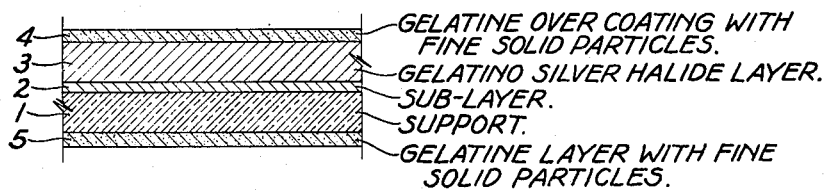
Fig. 1 shows a section on a much magnified scale of a photographic film embodying a preferred form of my invention.

In the preferred form the film has the usual support 1 of a plastic composition such as a cellulose ester, although the invention is applicable to paper or other supports.

A sub-layer 2 of any known type is customarily used beneath the sensitive layer 3 which may be of any type, but I have found my invention particularly useful with highly sensitive gelatino-silver-halide negative emulsions. Over this is coated a protective gelatine layer 4, containing very small quantities of finely divided solid particles causing a minutely roughened surface.

A desirable concentration producing the desired degree of minute roughening is of the order of one part by weight per thousand of the coating solution. The roughness produced is not apparent to the glance or touch, although detectable under a magnifying glass, and ordinarily the user will not be aware of its existence. It does, however, give an extremely slight tooth which is perceptible to a skilled retoucher, improving the surface for retouching purposes. This coating also very noticeably decreases abrasion of the type which affects photographic material and this is apparent upon development of two such films which have been drawn in contact, one over the other. The abrasion marks which ordinarily would be present in the developed film are materially lessened. Presumably this is because the surfaces provide a series of rounded points as bearing surfaces. It also decreases water spotting by which is meant the mottle or irregularities produced by uneven drying since the surfaces have a lessened tendency to hold individual drops of water. Another important advantage is the avoidance of Newton's rings in printing. The roughnesses, while practically invisible, are sufficient to prevent such intimate contact between the negative and the printing material in contact printing, or between the negative and the glass of the negative carrier in enlarging, as frequently causes Newton's rings with resultant marks on the print.

It is desirable to select a matting substance whose refractive index is approximately the same as the material of the layer and in some instances it may be soluble or removable in the processing solutions. Among the materials which may be used are silica, starch, particularly rice starch, fine particles of a resin or a cellulose ester. The particle size found most useful is less than .01 mm. and greater than .001 mm., and probably between .003 to .008 mm. and in the finished coating the surface will have from 20 to 100 particles per square mm.

The matting material must be sufficiently hard to maintain its shape under ordinary use and temperature, and is thus distinguished from relatively soft and easily deformed materials such as wax or its equivalent.

Examples of resins and esters suitable for my purpose are esters of polyacrylic and polymethacrylic acid such as polymethyl methacrylate; polyvinyl esters such as polyvinyl acetate; polyvinyl alcohol; co-polymers of styrene and methyl methacrylate; mixture of polyacrylate resins with cellulose ethers; cellulose derivatives such as cellulose acetate propionate and ethyl cellulose. Aqueous dispersions of mixed polymers may be made to produce particles having a refractive index in the region of that of gelatin, that is approximately 1.54.

The gelatine layer containing the fine particles may be added also to the rear surface of the support as at 5 where it is useful as a non-curling layer or as a carrier for fugitive anti-halation dye as well.

The anti-static advantages of a layer of the type described are attained in a sub-layer between the support and the emulsion layer, these properties being particularly useful in the manufacture of the film to prevent static during coating operations, when the sensitive emulsion is being applied to the previously subbed support.

Figure 2:
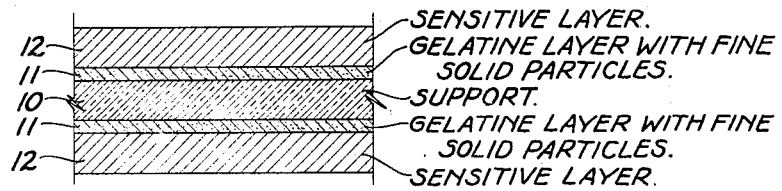
Fig. 2 shows a similar section of another embodiment of my invention.

An example is shown in Fig. 2, wherein the support 10 has coated upon each surface a sub-layer 11 having particles of the dimension and frequency described and sensitive layers 12 coated upon these. This embodiment is particularly useful in the manufacture of X-ray and other double coated films. Both sub-layers may be coated before either sensitive emulsion layer is applied and serve efficiently to prevent static during emulsion coating. That is the support with the sub-layers passes through the coating machine and one emulsion layer applied. The uncovered sub-layer is effective to reduce or prevent static during the subsequent winding of the film and its unwinding again preparatory to the emulsion coating of the second surface. At this stage it constitutes an article embodying my invention as claimed.

For the purposes of my invention a frequency of 35 irregularities per square millimeter is sufficient, but in exterior layers, I prefer a frequency of the order of 70 irregularities per square millimeter.

Figure 3:
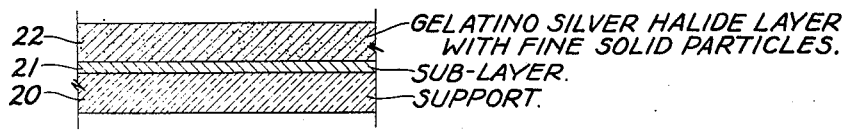
Fig. 3 shows a similar section of still another embodiment of my invention.

The inert particles may also be added to a fine grained sensitive emulsion as indicated in Figure 3, wherein 20 designates the support, 21 a sub-layer of usual type and 22 a sensitive gelatino-silver halide emulsion having therein particles added as described in the other examples, the size and frequency being dependent in part on the innate roughness of the sensitive emulsion itself.

It is obvious that the particles need be only on the surface of the layer in which they are incorporated but in manufacture it is simpler to include them throughout the layer in a single coating operation.

I contemplate as within the scope of my invention such modifications and equivalents as are included within the scope of the appended claims.

I claim:

1. A photographic film including a support and a photographically sensitive layer, and including at least one gelatine layer containing inert, relatively hard, finely divided non-lubricating particles of a size less than .01 mm. and greater than .001 mm. and in quantities insufficient to cause more than 100 minute irregularities per square millimeter in the surface of the layer, the size and number of the irregularities being insufficient to render the film visibly matte.

2. A photographic film comprising a support, a sensitive layer and an outer layer over said sensitive layer containing finely divided, relatively hard, non-lubricating particles of a size greater than .001 mm and less than .01 mm. in size and in quantities insufficient to cause more than 100 minute irregularities per square millimeter in the surface of the outer layer, the size and number of the particles being insufficient to render the film visibly matte.

3. A photographic film comprising a support, a highly sensitive gelatino-silver-halide emulsion layer thereon and an outer unsensitized gelatine layer containing finely divided, inert, relatively hard, non-lubricating particles of a size greater than .001 mm. and less than .01 mm. and in quantities insufficient to cause more than 100 minute irregularities per square millimeter in the surface of the outer layer, the size and number of the said particles being insufficient to render the film visibly matte.

CARL G. LINDQUIST.